United States Patent
Palmer et al.

(10) Patent No.: US 6,383,536 B1
(45) Date of Patent: *May 7, 2002

(54) INTERACTIVE FOODSTUFF HOLDING DEVICE

(76) Inventors: William Randall Palmer, 2510 Knollwood Dr.; Stephen Lynn Palmer, 4391 Cameron Rd., both of Cameron Park, CA (US) 95682

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,233

(22) Filed: Aug. 19, 1999

Related U.S. Application Data

(60) Provisional application No. 60/097,421, filed on Aug. 20, 1998.

(51) Int. Cl.⁷ .............................. A23G 1/00; A23G 3/00
(52) U.S. Cl. .......................... 426/104; 426/90; 426/91; 426/132; 426/134; 446/81; 446/404; 446/484
(58) Field of Search ................................ 426/104, 132, 426/134, 420, 90, 91; 446/71, 73, 81, 175, 202, 213, 297, 404, 397, 484; 340/384.1, 384.3, 384.7, 692

(56) References Cited

U.S. PATENT DOCUMENTS

| | | | | |
|---|---|---|---|---|
| 3,966,972 A | * | 6/1976 | Theimer et al. | 426/90 |
| 4,282,681 A | * | 8/1981 | McCaslin | 446/484 |
| D260,655 S | * | 9/1981 | Guay | D17/22 |
| 4,383,386 A | | 5/1983 | Giordano et al. | 46/14 |
| 4,832,652 A | * | 5/1989 | Matsuyama | 446/397 |
| 4,914,748 A | * | 4/1990 | Schlotter, IV et al. | 362/109 |
| 5,089,745 A | * | 2/1992 | Iannini | 315/76 |
| 5,209,692 A | | 5/1993 | Coleman et al. | 446/71 |
| 5,391,107 A | | 2/1995 | Coleman | 446/484 |
| 5,464,092 A | * | 11/1995 | Seeley | 206/217 |
| 5,471,373 A | | 11/1995 | Coleman et al. | 362/109 |
| 5,876,995 A | * | 3/1999 | Bryan | 435/189 |
| 5,902,167 A | * | 5/1999 | Filo et al. | 446/81 |
| 5,939,983 A | * | 8/1999 | Rudell et al. | 340/540 |
| 5,971,829 A | * | 10/1999 | Hartman | 446/236 |
| 6,054,156 A | * | 4/2000 | Rudell et al. | 426/104 |

FOREIGN PATENT DOCUMENTS

WO 94/17691 * 8/1994

OTHER PUBLICATIONS

Merriam–Webster's Collegiate Dictionary, 10th Edition, p. 34, 1993.*

* cited by examiner

Primary Examiner—Nina Bhat
(74) Attorney, Agent, or Firm—McHale & Slavin

(57) ABSTRACT

An interactive foodstuff emits sound, light, motion or other action by the control and/or manipulation of the electrical, optical or physical conditions of or proximal to the foodstuff.

12 Claims, 13 Drawing Sheets

INTERACTIVE FOODSTUFF HOLDING DEVICE

This application claims benefit under 35 USA 119(c) of Prov. Applic. No. 60/097,421 filed Aug. 20, 1998.

FIELD OF THE INVENTION

This invention is directed to children's toys and, in particular, to an interactive foodstuff holding device that produces actions based upon real-time physical characteristics of a secured foodstuff item.

BACKGROUND OF THE INVENTION

A great number of novel food items and in particular, candies are known. Recently, several devices have been created which incorporate a sound, light or motion generating means with a candy product. Some of these devices are simply electric motor systems which spin a lollipop in the user's mouth. Others, use the inherent light transmitting properties of some candies to create an illuminated, edible element. Light sources used have included electric lamps and chemiluminescent lighting elements. Still other novel food items include battery powered, motor operated dispensers or candy holders with electronic sound generating means which produce music or a rhythmic sound when a conventional, manual electric switch is operated. U.S. Pat. Nos. 4,383,386; 5,209,692; 5,391,107; and 5,471,373 disclose examples of these devices.

SUMMARY OF THE INVENTION

The instant invention teaches of a new and highly interesting system which can be used with a wide variety of foodstuffs (both nutritive and non-nutritive) and which relies on controlling, optical, electrical or other physical conditions which may be operatively coupled with the foodstuff to control an action generating means. Such action may include but is not limited to any of the following activities: sound generation; lighting generation; and motion generation, such as rotation, translation or vibration.

Thus it is an objective of the instant invention to provide an interactive foodstuff holding device that produces action based upon real-time interaction with physical characteristics of a secured foodstuff item.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the instant invention and illustrate various objects and features thereof.

DETAILED DESCRIPTION OF THE PREFERRED EMBODIMENT

Figure 1:
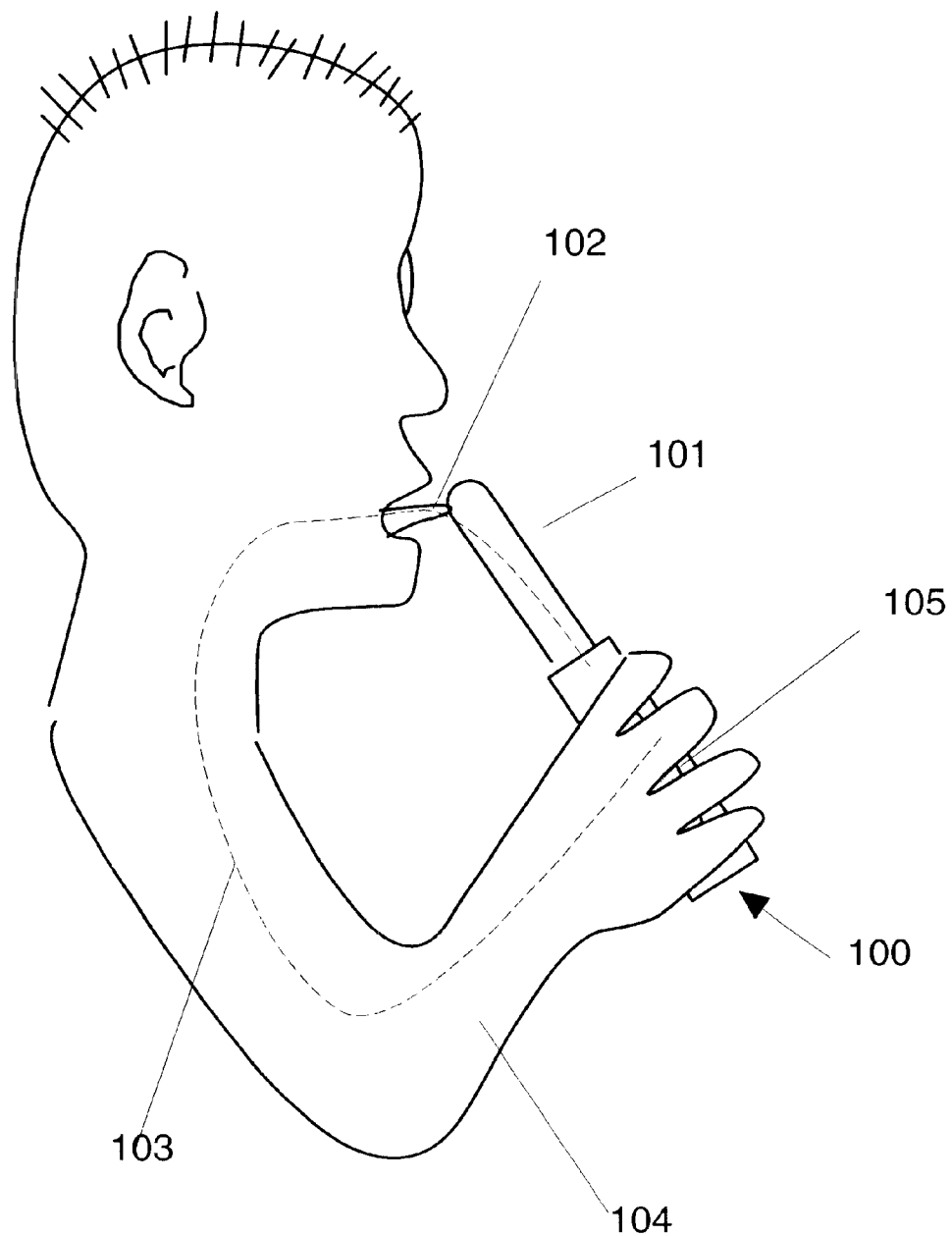
FIG. 1 illustrates the operation and shows electrical current path of one embodiment of the instant invention.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now with general reference to the drawings and, in particular to FIG. 1, the variable output foodstuff holding toy device 100 of the present invention is shown. Action within the holder 100 is triggered and/or controlled by a portion of the user's body 102,104 that comes in contact with or in close proximity to the edible foodstuff 101 by the user's tongue, mouth, body or other object.

It is noted that the terms "resistance" and "conductivity" as applied to electrical circuits are understood to be reciprocal values of one another but for the purposes of this text will be used interchangeably since changes either in resistance or conductivity will produce the desired effects of the instant invention.

In one embodiment, an electrical circuit 103 is constructed, in which a minute electric current passes from an electrically conductive foodstuff 101 through a holder 100, to the user's hand and arm 104 and up to the user's mouth or tongue 102, whereby the circuit is completed when the mouth, tongue or other body member comes in contact with the foodstuff. A voltage controlled oscillator, or otherwise operable sound or action generating means 132 is employed in holder 100. Holder 100 also serves to support edible foodstuff 101. Holder 100 may be at least partially electrically conductive or have a label 105 which is at least partially conductive to aid in completing electric circuit path 103 from holder 100 to user's hand and arm 104. When edible foodstuff 101 is touched to tongue 102, the electric circuit path 103 is completed and any desired action generating means 132 may be triggered.

Figure 2:
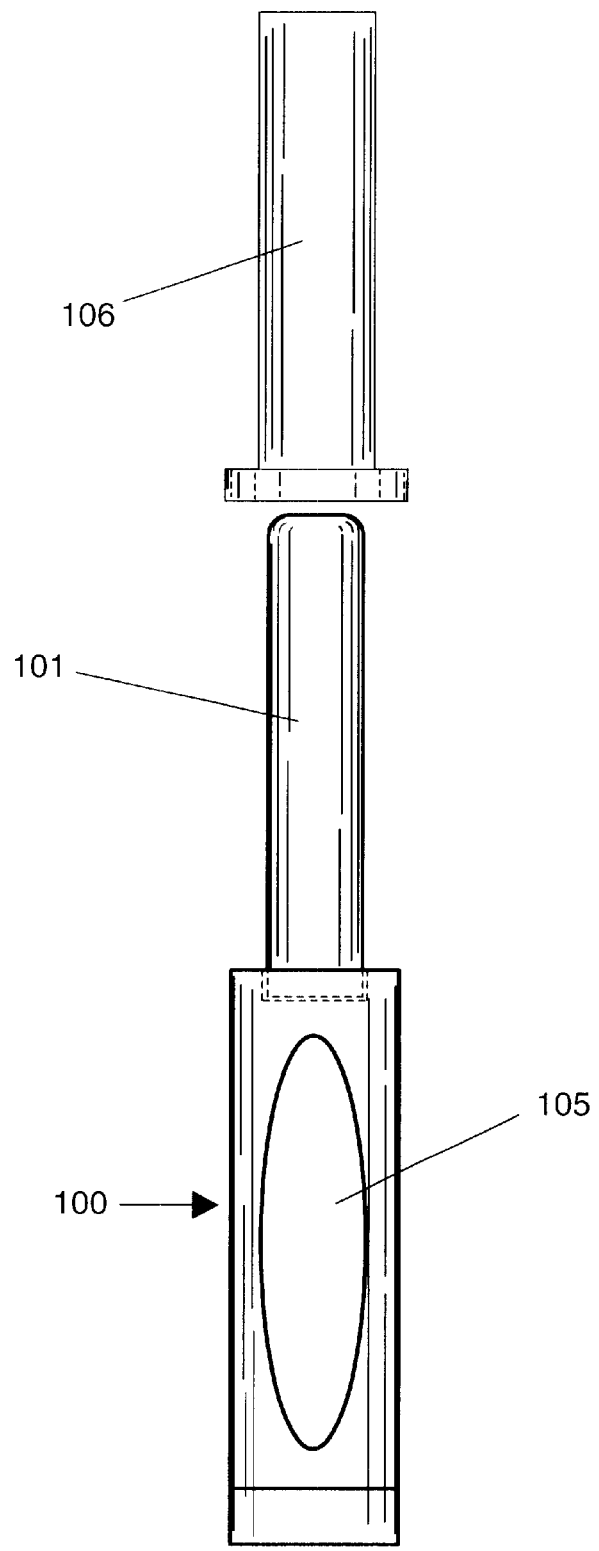
FIG. 2 is a detail drawing of one embodiment of the instant invention.

Referring now to FIG. 2, one embodiment of the instant invention comprises of holder 100 with label 105 and edible foodstuff 101. A protective cover 106 may be employed to protect edible foodstuff 101 during shipping and periods of disuse.

The holder 100 may also be constructed to provide the same operational features while being controlled by variations in the electrical capacitance created by the position of the food stuff 101 in relation to the holder 100 and the user's mouth or other body member 102,104. This version of the instant invention does not require that the foodstuff 101 be conductive but instead that it exhibit dielectric properties so that a capacitive element may be formed between the user's mouth or tongue 102, for example, and the foodstuff holder 100. Voltages and currents are necessarily kept low to prevent injury or even the perception of injury to the user. Indeed, circuits developed for the instant invention rely on currents in the range of 100 nano-amps which are undetectable to the user. A circuit in which changes in capacitance are employed to control action generating means 132 may be of the direct current, alternating current or radio frequency type.

The preferred embodiment of the instant invention relies on controlling the level of light which may be transmitted through or proximal to a portion of a lollipop 301. A photo sensor 308 and electronics 304, convert said light level to an action such as the generation of a musical note. The level of light passing through or proximal to the foodstuff may be controlled by the relative position of the foodstuff to the user's mouth or tongue 102, hand or other body element 104, or object, thereby resulting in action of the device 300 which is responsive to the motion or position of the user.

Yet another means of achieving the desired interactive relationship between the user and the device of the instant invention is to employ electromagnetic fields and/or radio waves. Said fields or waves being interrupted, absorbed, reflected or otherwise altered by the position of the user or user's extremities or other objects relative to the instant invention.

Figure 3:
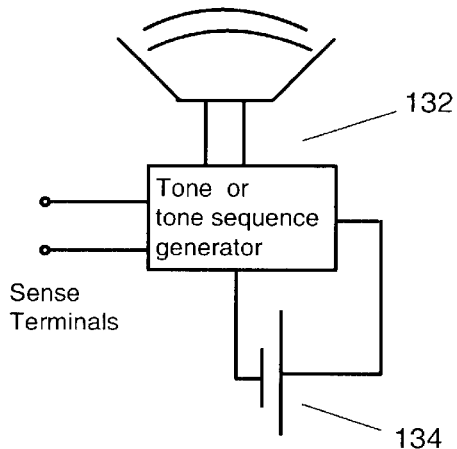
FIGS. 3–6 illustrate some possible configurations of sound control using one embodiment of the instant invention.

The device output may be altered in response to variations within the included electrically conductive path 103. When current and/or capacitance in the heretofore described circuit 103 exceeds a predetermined threshold, an electronic circuit is energized or otherwise controlled which may produce any combination of the following effects:

1. A single audio frequency tone is generated as long as the electric circuit path 103 is completed (contact of edible foodstuff 101 with tongue or mouth 102 while holding holder 100 in one's hand 104 completes the circuit.) FIG. 3 is a block diagram showing how a tone generator or tone sequence generator 132 may be triggered by completing the electrical circuit between the sense terminals. In this case the sense terminals are the user's tongue 102 and edible foodstuff 101.

Figure 4:
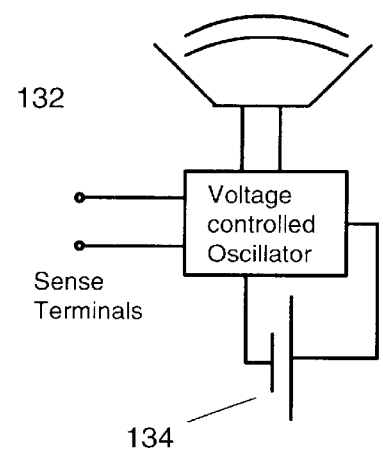

2. An audio frequency tone which frequency is proportional to current or capacitance in the circuit is generated. Changing contact position of the tongue 102 relative to the edible foodstuff 101 for example, causes the audio frequency to change proportionately. FIG. 4 is a block diagram which illustrates how a changing ohmic value when presented to the sense terminals may be used to control the musical pitch or frequency of a voltage controlled oscillator 132. Once again, sense terminals are the user's tongue 102 and edible foodstuff 101 whereby the varying ohmic value is controlled by tongue or mouth pressure, degree of contact to edible foodstuff 101 and other means as described elsewhere in this text.

3. An audio frequency tone which volume is proportional to the current or capacitance in the circuit is generated.

4. A series of audio frequency tones or notes is generated in response to contact of the edible foodstuff by the tongue, mouth or other body member. A song, rhythm or other musical piece could be produced by the device whereby this action is initiated for example by contact of the user's tongue to the foodstuff.

Figure 5:
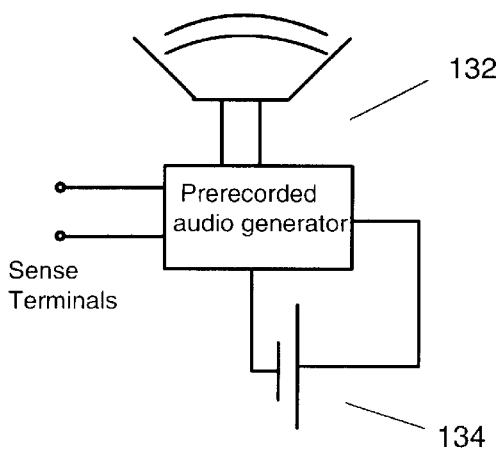
Figure 6:
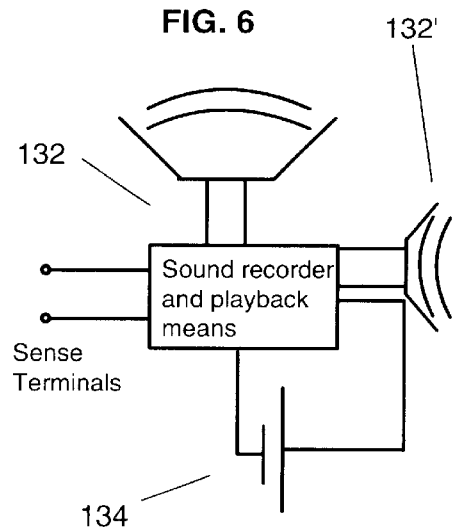

5. A prerecorded sound is replayed in response to contact of the edible foodstuff by a body member. This prerecorded sound may be permanently stored in a memory device which is programmed during device manufacture. FIG. 5 is a block diagram which shows how a sound generator with prerecorded audio may be triggered and or controlled by the ohmic value presented to the sense terminals. Again, sense terminals are the user's tongue 102 and edible foodstuff 101. Alternately, the sound to be generated may be recorded by the user at some time prior to playback. For example, a personal message could be recorded in such a device by an individual with the intent that it be replayed by another individual. FIG. 6 is a block diagram of an audio record and playback means whereby at least the playback is triggered and or controlled by presenting an ohmic value to the sense terminals as previously described.

Figure 7:
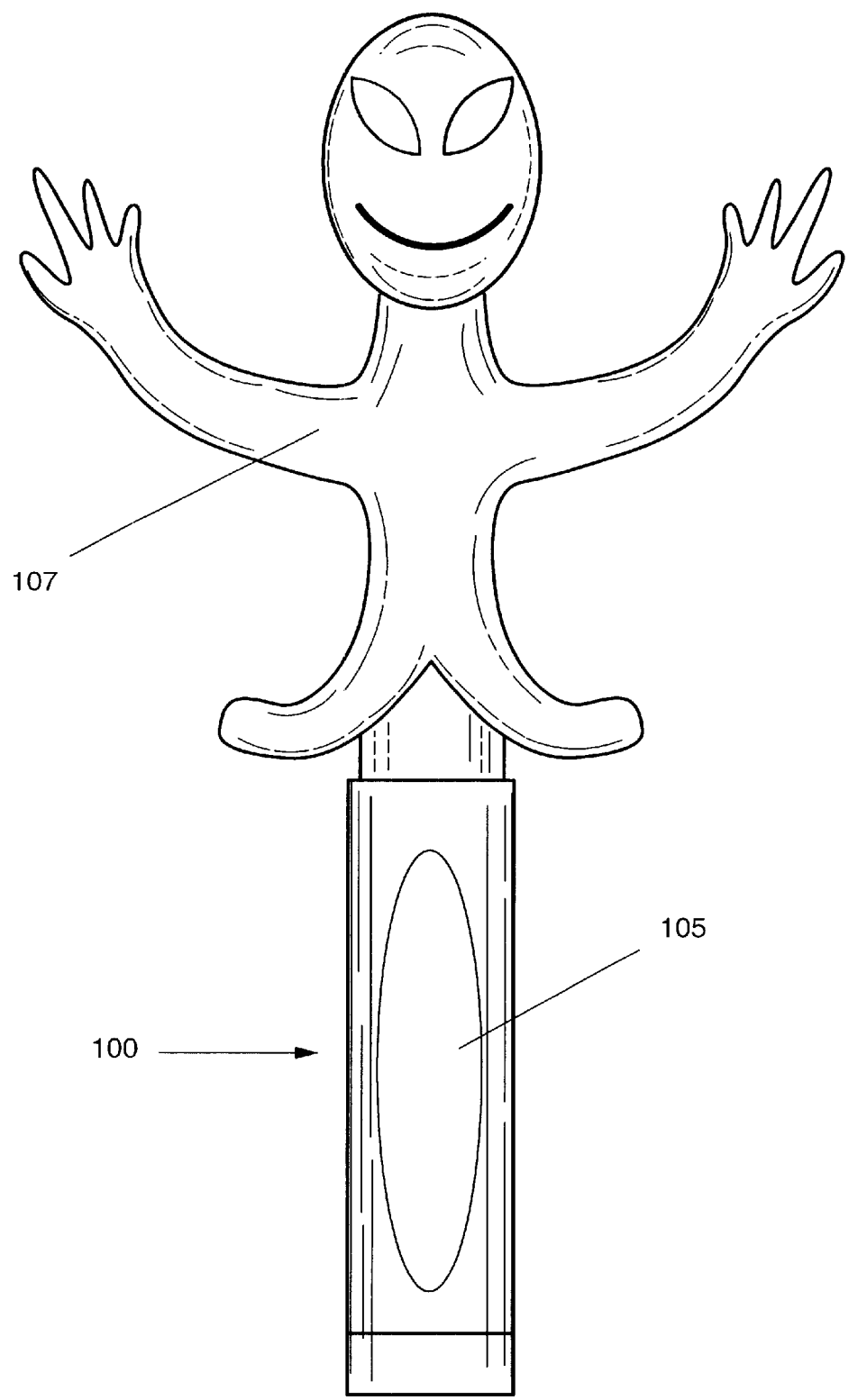
FIG. 7 details an electrically conductive, edible figure and foodstuff holder.

A particularly interesting device would be one which employed a prerecorded animal sound which correlated with the shape and design of the foodstuff. For example, a piece of taffy in the shape of a frog could emit a loud "ribbet" when licked or otherwise contacted. Likewise, a "space alien" could emit a cry when its head, arms or other extremities were bitten off. FIG. 7 shows how an electrically conductive edible FIG. 107 may be coupled to holder 100 in one embodiment of the instant invention.

Young boys seem particularly attracted to rather grotesque themes such as the aforementioned. Indeed, each extremity of the creature could have a unique resistance value or contact connection and hence a unique sound associated with it. A game such as "hangman" could be played whereby portions of the creature are successively eaten until the creature is completely consumed. The user's actions may be prompted by sounds produced by the instant invention.

A fire engine siren sound could be generated each time the user's tongue touched a piece of "hot" cinnamon candy. Devices holding candy containing sour tasting ingredients such as malic acid might produce a "yecchh!" sound each time the candy element was contacted to the user's tongue.

6. A game sequence which may take, for example, the form of user input consisting of multiple and or repeated tongue contact with the foodstuff in response to sounds and or lights emitted from the electronic circuit. One version of such a game is commonly known as "memory." In this game the electronic circuit emits a series of notes or tones. The user must thereafter repeat this series of notes or tones. Proper repetition of the notes or tones is rewarded when the device repeats and then adds to the series, thereby presenting a new challenge to the user. Improper repetition is announced by an unpleasant tone often referred to as a "raspberry." LED's or or other lighting means could be employed to provide feedback to the user in conjunction with or apart from sounds generated by the device.

Another game which could be employed would be a teaching game whereby the device emits tones or beeps or flashes of light corresponding to numerical values and a mathematical operator. The user then must respond by providing the proper solution to the mathematical problem. A reward and punishment scheme similar to that described above could also be used with this type of game with the reward being, for example, a brief musical tune. The user could select predetermined operators if desired to eliminate the need for the device to produce them. In such a scheme if an "addition" operator was chosen, the following sequence might occur:

Device: "beep-beep""beep-beep" (what is 2+2?)
User: Lick, Lick, Lick, Lick (4)
Device: (plays a musical tune and presents a new problem to be solved)

Pre-selection of the mathematical operator or, indeed, the nature of the game to be played could be selected by user input in the form of a series of contacts with the foodstuff or by means of a conventional, manually operated switch(s). A small microcontroller driving a speaker could perform the functions discussed above with the single user input being tongue contact to the conductive foodstuff. The rate of tongue contact, the position of tongue contact on the foodstuff, force with which the tongue contacts the foodstuff or surface area contacted, or a combination of these could serve to provide feedback to the microcontroller and hence, user inputs to the game.

7. Another version of the device, as shown in FIG. 6, employs a microphone 132' to monitor sounds and/or vibration transmitted through the foodstuff when licked, bitten or chewed. This sound is amplified and played through a loudspeaker. A system with this feature would provide amusement each time the foodstuff was licked, bitten or chewed. The microphone 132' and loudspeaker 132 could be combined in one device with a switching means to first record and then alternately playback sounds. Sounds produced may include a loud or exaggerated licking or slurping noise which may include playback of the recorded sound with deliberate distortion and/or amplification.

It is understood that variations in the electrical resistance of the current path particular to the food stuff may be due to any combination of the following:

1. Specific conductivity of the foodstuff;
2. Moisture present in the foodstuff or on the surface of the foodstuff;
3. Tongue, mouth, or other body member contact point location on the foodstuff, relative to the current path;
4. Surface area contacted by the body member either on the edible foodstuff and/or the at least partially conductive holder;
5. Force of contact between the edible foodstuff and the body member and/or force of contact between the at least partially conductive holder and a body member;
6. Alterations in the geometry of the edible foodstuff such as stretching or compressing the foodstuff so that the conductive cross section of the current path is altered or, by changes in the foodstuff geometry by removing portions of the foodstuff through such actions as biting and/or tearing with the teeth or fingers; and
7. Alterations in the geometry of the edible foodstuff such as stretching or compressing the foodstuff so that the conductivity of the foodstuff is altered by compression or expansion of the foodstuff or otherwise changing its structure.

Similarly, versions of this device which are controlled by variations in electrical capacitance rather than resistance may employ any of the well known means of changing the effective capacitance of the circuit to produce the same effects. Such means include varying one or more of the following parameters:

dielectric constant, surface area, distance between conductive elements.

Foodstuffs anticipated for use with the device include, but are not limited to the following:

Taffy, chewing gum, licorice, fudge, cotton candy, marshmallow, caramel, "gummy candies" (gelatin based candies such as "Gummy Bears" manufactured by Heide, Henry, Inc. New Brunswick, N.J.), hard candies (which may contain various sugars and/or corn syrup), fondants, breads, cakes, cookies, crackers, cheeses, vegetables (such as carrots and the like), fruits, jerked meats, or frozen confections such as ice cream and juice bars.

Incorporation into the foodstuff of air or other relatively poor electrical conductors may be employed to reduce and/or control the electrical conductivity or dielectric constant of the foodstuff. Likewise, water or ionizing agents may be dispersed or dissolved into the foodstuff to alter the electrical conductivity or dielectric constant of the foodstuff.

A listing of measured resistance values for various confectionery items is shown in Table 1.

TABLE 1

Table of measured resistance values for selected edible foodstuffs
All measurements made at approximately 72° F. with Omega HHM25 digital multimeter. Probes and leads were as supplied with meter.
Except as noted, meter probes were placed flat against surface of foodstuff and were 1" apart as measured in the longitudinal direction of the candy.
Both probes were pressed firmly against the foofstuff surface.
Foodstuff elements were wetted on the surface by repeated licking.

| Foodstuff Description | Product Name/Manufacturer | UPC code | Measured ohms per linear inch, Dry | Measured ohms per linear inch, Wet |
|---|---|---|---|---|
| Soft Black Licorice | Licorice Vinos ®/American Licorice | 41364-0027 | 14 MΩ | 0.6 MΩ |
| Soft Sour apple Taffy | Laffy Taffy ™/Sunmark | 284740 | 30 MΩ | 4 MΩ |
| Very soft Gelatin Worms | Gummi Worms/Favorite Brands | 75602-07131 | 4 MΩ | 2.5 MΩ |
| Pressed powder disk | Giant Tarts ®/Sunline Brands | 791672 | >40 MΩ | 0.6 MΩ |
| Hard lolly pop | Banana Split Astro Pop ® | 30800-00845 | >40 MΩ | 40 MΩ |
| Soft Fudge Candy | Tootsie Roll ®/Tootsie Roll Ind. | 71720-00933 | 4.5 MΩ | 4 MΩ |
| Hard lolly pop | Jumbo Push Pop ®/The Topps Co. | 41116-00577 | >40 MΩ | 40 MΩ |
| Soft Taffy | Tangy Taffy ®, Straw/Van/Sunline Brands | 79200-14136 | >40 MΩ | 2 MΩ |
| Med. Soft Bubble Gum | The Yardstick ™ Bubble Gum/Foreign. Candy Co. | | >40 MΩ | 1 MΩ (see Note 1) |
| Hard candy stick | Chick-o-Stick ® | 41168-00640 | >40 MΩ | no data |
| Caramel | Sugar Daddy ® | 14200-53210 | >40 MΩ | 10 MΩ |
| Soft Fudge Candy | Tootsie Roll ® | 71720-00933 | 12 MΩ (see Note 2) | no data |

Note 1: Bubble gum chewed for approximately 2 minutes prior to this measurement.
Note 2: ¾" long Resistance meter probes pushed fully into opposite ends of candy The electrical property of the foodstuff used to trigger and/or control the action generating means need not be uniaxially constant or even constant in the same axis with respect to location along that axis. For example, a combination of differing types of foodstuffs may be combined by layering, partial kneading, folding, or extrusion which produces a mass which has differing electrical properties depending on the orientation of current flow or electrostatic potential.

Figure 8:
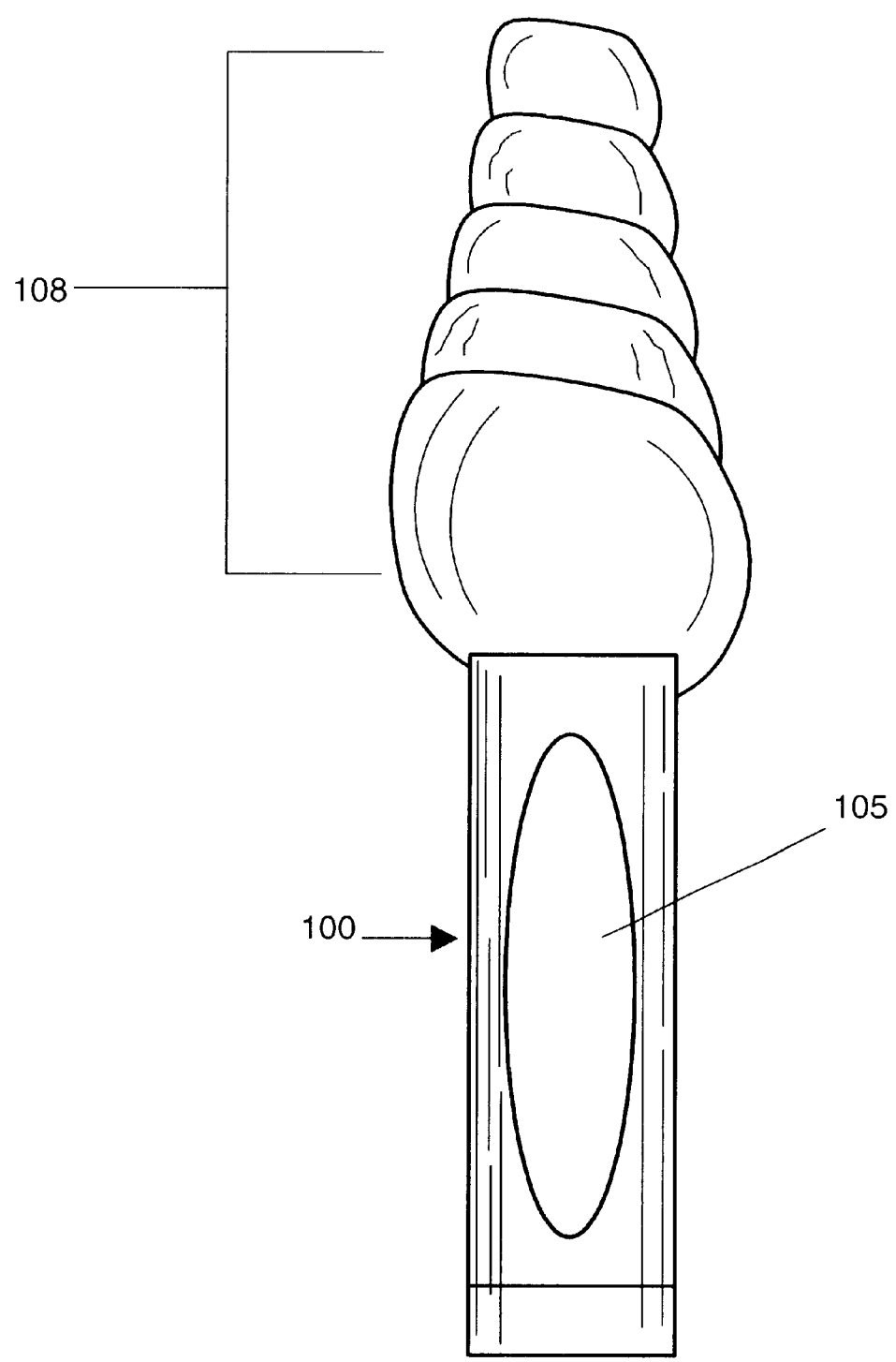
FIG. 8 illustrates the use of foodstuffs of differing conductivities to create a non-linear electrical circuit.

FIG. 8 shows how nonhomogeneous foodstuffs 108, that is foodstuffs with differing electrical properties, may be combined to create circuits which exhibit a non-linear conductivity function with respect to point of contact. Such nonhomogeneous foodstuffs 108 could exhibit a non-linear change in either electrical conductivity or electrical capacitance with a linear change in point of contact. Indeed, foodstuffs 120,130 exhibiting differing electrical properties could be suspended in one another. For example, spheroids of highly conductive candy may be suspended in a candy of relatively lower conductivity. When a user contacts the more highly conductive portions of the candy matrix a non-linear change in resistance with respect to the position of the user's tongue on the candy will be realized.

Figure 9:
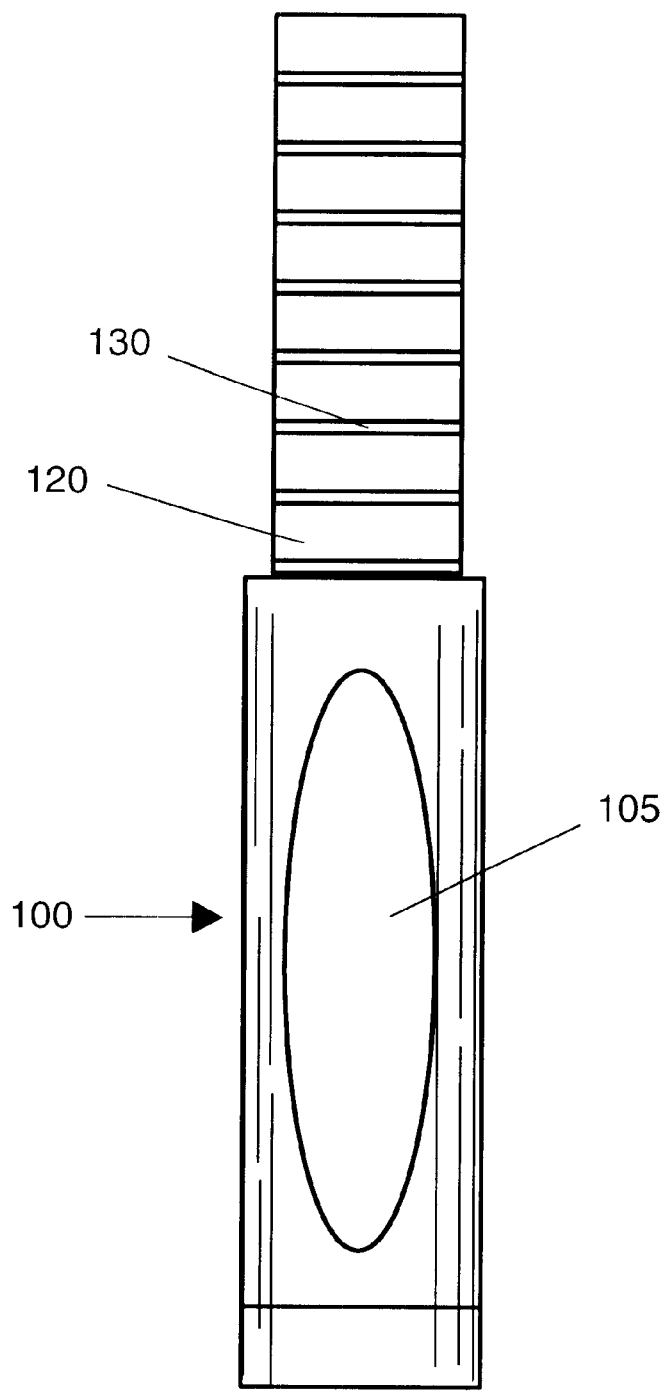
FIG. 9 illustrates the use of foodstuffs of differing conductivities to create a potentiometer.

FIG. 9 illustrates how for example, a more conductive foodstuff element 120 could be alternately stacked with a less conductive foodstuff element 130. This would yield a "potentiometer" which could generate a resistance "step" function with respect to linear changes in the contact point of current flow. If a voltage controlled oscillator 132 (VCO) was connected to a power source 134 placed in series with this stack of foodstuffs (candy, for example) an "electronic harmonica" is created whereby relative position of the user's tongue causes discrete, predetermined notes to be played. When coupled with the holder base 100 described above whereby portions of the user's body 102,104 become part of the electrical circuit, a practical, edible, electronic musical instrument is created.

Figure 10:
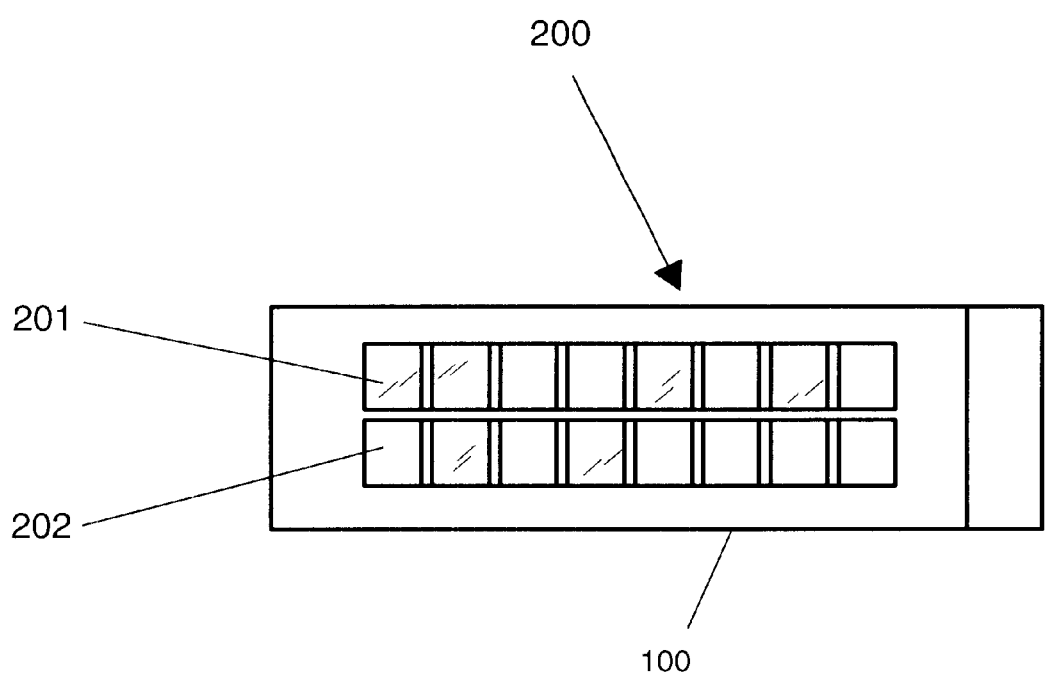
FIG. 10 shows how a "harmonica" may be constructed with electrically conductive foodstuffs.

A further variation on the instant invention includes a foodstuff 101 which may be combined with an electronic circuit 103 to product the effects described previously whereby only a very small portion of the user's body becomes part of the circuit. For example, the harmonica 200 in FIG. 10 may present two adjacent contacts to the user's tongue or lips 102. When the circuit between these two contacts is completed via the user's tongue or lips, a musical note is produced. Several sets of contacts may be employed in like fashion to produce a harmonic scale of musical notes. A first edible foodstuff array 201 and a second edible foodstuff array 202 may be positioned relative to each other so that when corresponding elements of these arrays are connected via contact with the user's mouth or tongue 102, a note specific to these elements is generated. In a device such as a harmonica 200, the holder 100 need not necessarily be electrically conductive.

Figure 11:
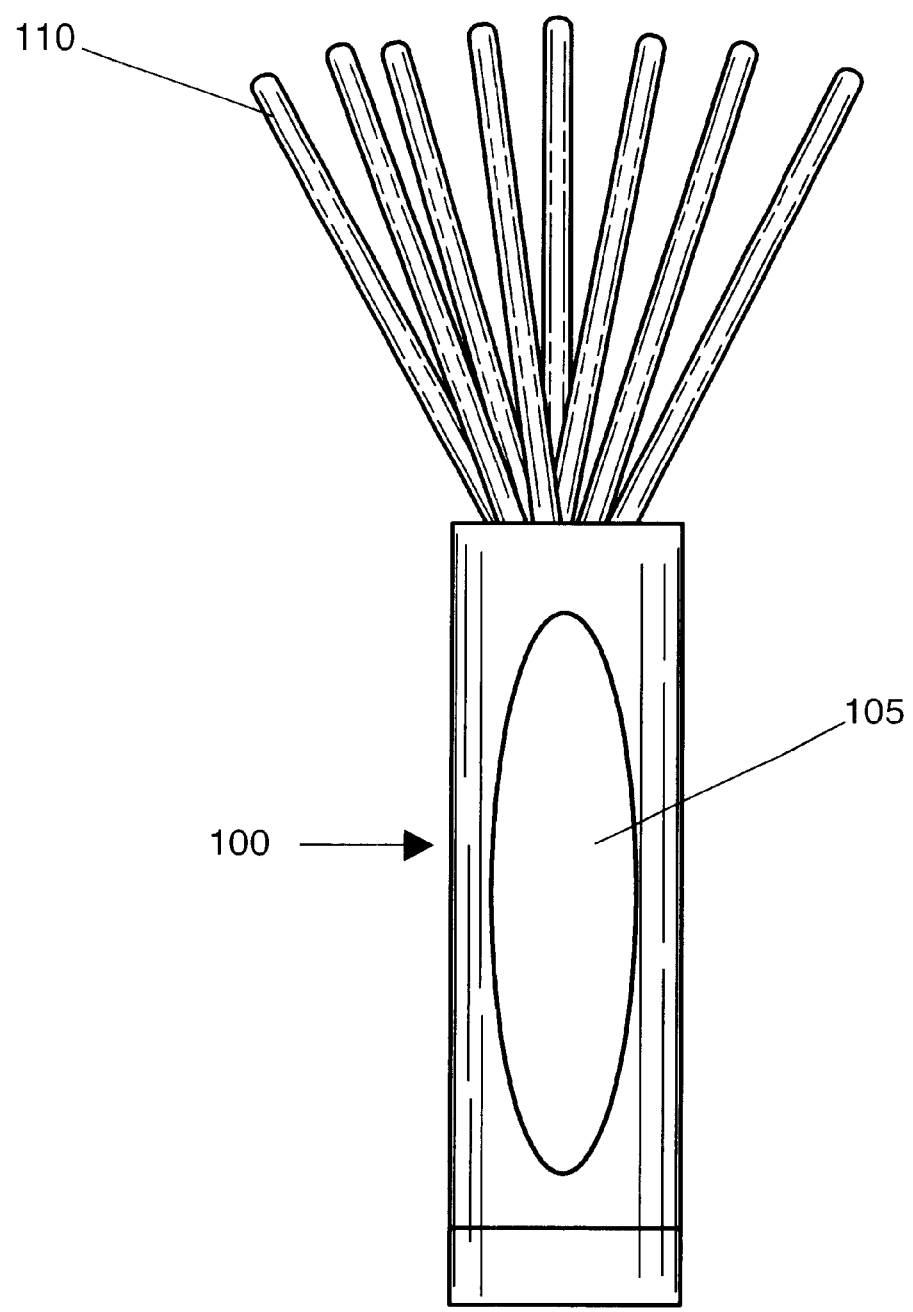
FIG. 11 illustrates the concept of using individual edible elements to trigger discrete action means.

A still further variation of this device utilizes a plurality of edible elements 110 connected to various sites on the holder in such a fashion that they do not communicate electrically with one another. Each holder site produces a different response when its circuit is completed. For example, FIG. 11 shows how eight isolated foodstuff elements 110 may be positioned, each in contact with one of eight electrical inputs which are connected to an electrical sound generation device 132. Touching each element 110 produces a unique sound or action regardless of how or where the candy piece is touched. Such a system is included in the scope of the instant invention.

Additionally, a single piece of candy 101 may be connected to a single electrical contact with various sound selections being made by finger contact on a plurality of electrically conductive regions (or push button switches) on the holder 100. Sound generation would not commence until the user's tongue 102 contacted the single piece of candy, thereby completing the circuit. Musical note selection would be similar to that of a flute whereby fingering position selects the note to be played and contact with the tongue or mouth 102 serves to switch on the note.

Figure 12:
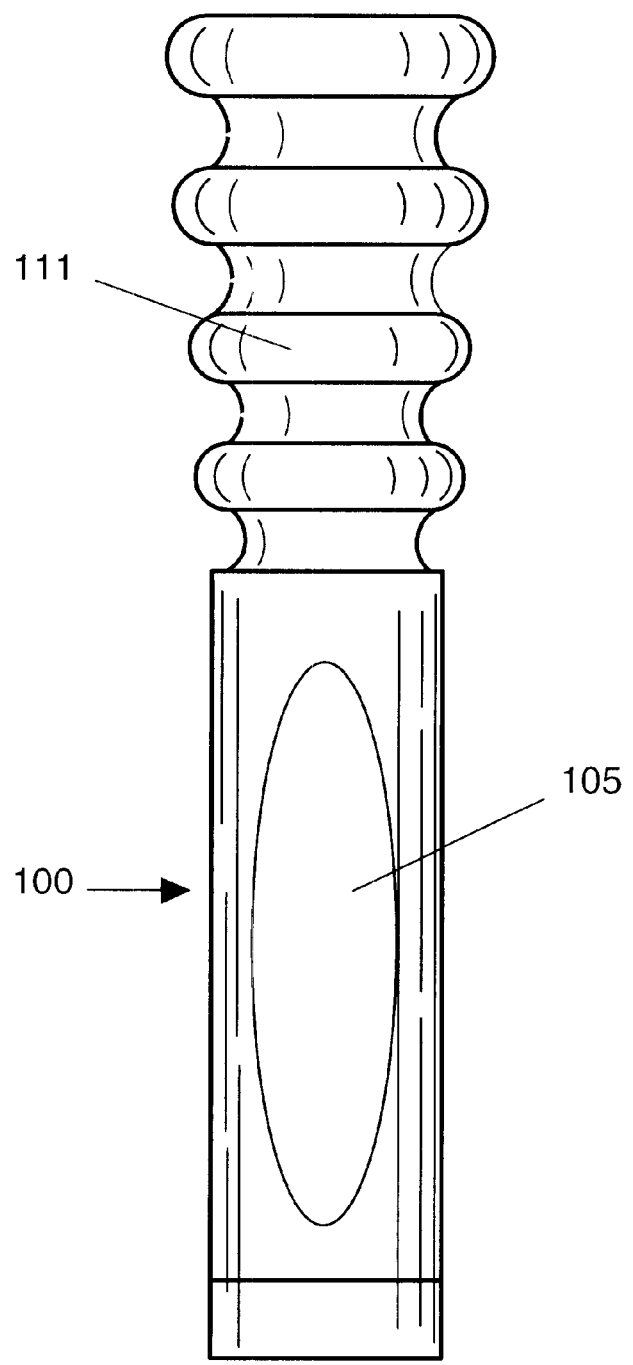
FIG. 12 shows how conductive foodstuffs with an irregular surface may be used to create a rapid make-and-break signal.

Another variation of the device would have the foodstuff 111 take the form, for example, of a solid of revolution resembling a high voltage electrical insulator. Irregularly surfaced foodstuff element 111, as illustrated in FIG. 12, would permit the user to run his tongue 102 across the surface of the foodstuff thereby making and breaking contact with the foodstuff. This would permit a rapid succession of changing electrical inputs to be created by the user which could produce unusual and interesting sound and/or lighting effects. A similar input means could be created by twisting or otherwise forming together (as when producing a striped candy cane) a plurality of foodstuffs 120,130 with differing electrical properties.

Again referring to FIG. 13, the device output may also be altered in response to variable optical input. An alternate embodiment of the instant invention uses varying levels of light which may be transmitted through the foodstuff or proximal to the foodstuff to a light controlled oscillator or other electronic system. With a light controlled oscillator for example, the user may control the pitch of the oscillator by the relative position of the foodstuff to the mouth. A musical tune may even be played by carefully controlling relative position of the mouth and the foodstuff. The source of light for this device may be derived from natural ambient light or may come from an artificial source such as a room lamp or even from a light source which is integral to the foodstuff holder. Said light source may consist of visible light, invisible(e.g. infrared or electromagnetic) light, or a combination of visible and invisible light. Any of the previously mentioned effects or games may be triggered and or controlled by this optical means.

It is understood that variations in the level of light reaching the photo sensor may be due to any combination of the following situations:

1. Light transmittance at a given wavelength of the lollipop 301;
2. Inclusion of entrained air bubbles, particles or other objects which may contribute to a nonhomogeneous nature of the lollipop 301;
3. Contact point location on the foodstuff 301, for example, tongue or mouth 102 position on the foodstuff and hence blockage of some or all of the light otherwise received by the photo sensor or alternately, degree of obscuration of light reaching the photo sensor due at least in part to the degree of coverage of the foodstuff or photo sensor proximal to the foodstuff by the user's mouth, tongue or other body part or other object;
4. Portion of lollipop 301 shielded from light by user's mouth or tongue 102, other body part 104, or other object;
5. Level of light available to which the foodstuff 301 is exposed;
6. Alterations in the geometry of the edible foodstuff such as stretching or compressing the foodstuff 301 so that its optical transmission properties are altered or by changes in the foodstuff geometry through removal of portions of the foodstuff by such actions as biting and/or tearing with the teeth or fingers; and 7. Alterations in the geometry of the edible foodstuff such as stretching or compressing the foodstuff so that the optical properties of the foodstuff are altered by compression or expansion of the foodstuff or otherwise changing its structure.

Figure 13:
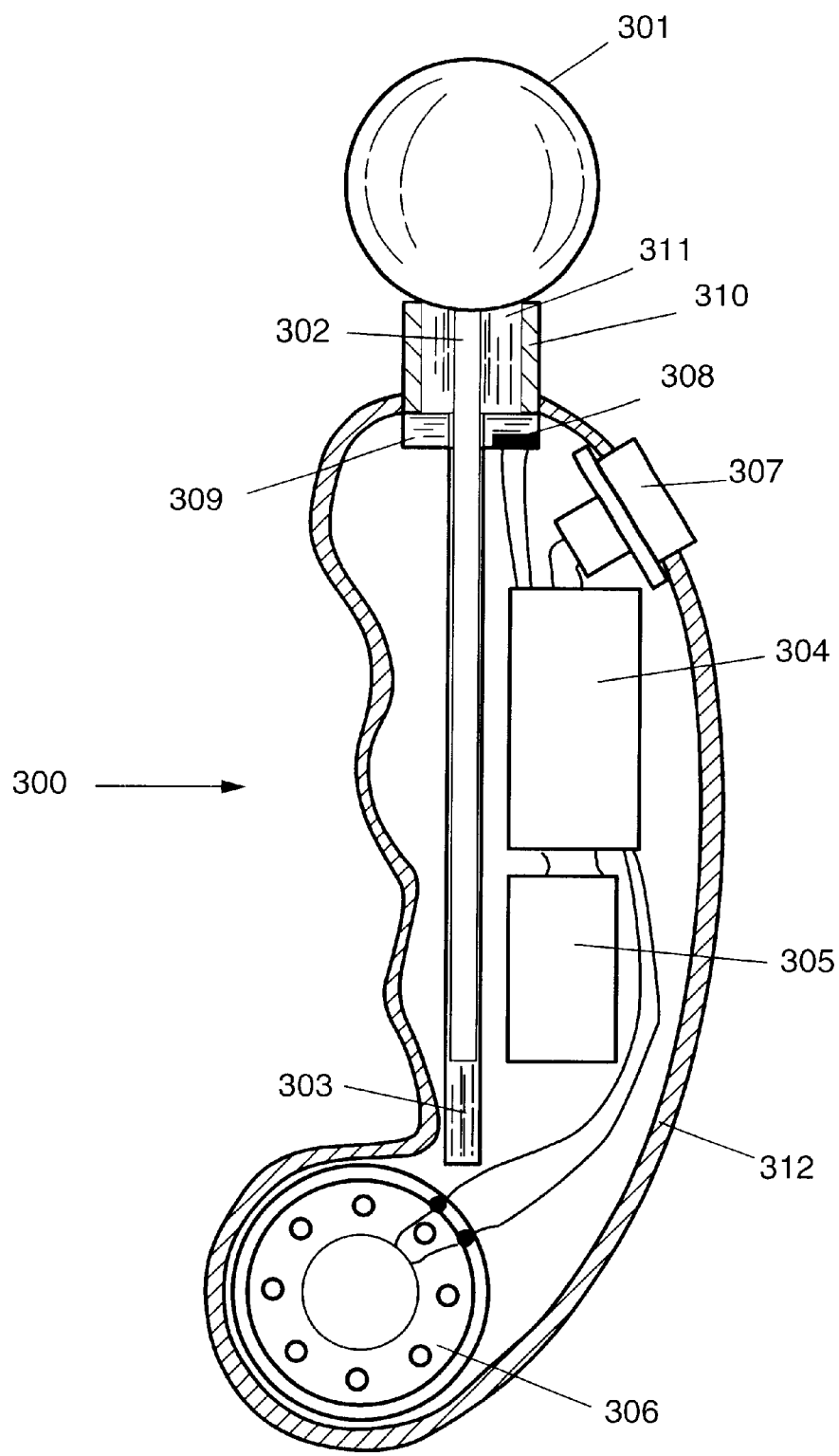
FIG. 13 details the design of a foodstuff holder in which the musical pitch of an oscillator is determined by controlling light levels.

In the preferred embodiment of the present invention, shown in FIG. 13, the means of control relies on varying levels of light through or proximal to a candy element. A candy holder with optical control 300 holds a lollipop 301. Lollipop stick 302 may be gripped or otherwise held by stick receiver 303. Stick receiver 303 may optionally be in the form of a tube designed in such a manner so as to receive lollipop sticks of varying diameters and lengths. Stick receiver 303 may be designed with a slight curve so that an interference fit is created between the sides of stick receiver 303 and lollipop stick 302. Included electronics 304 comprises sound, light or other action generating means as may be desired. The embodiment of the instant invention as illustrated in FIG. 13 employs a solid state electronic oscillator to create sound. The included electronics 304 are powered by battery 305. Electrical output from the electronics 304 is electrically connected to loudspeaker 306. A push button switch 307 turns the device on and off as desired. The electronic oscillator is of a variable frequency type which frequency is controlled by photo sensor 308. Photo sensor 308 is exposed to varying levels of light through optical window 309 which is in optical communication with optical passage 311. Optical window 309 serves not only to permit the passage of light but also to prevent spittle from contacting photo sensor 308 or from entering housing 312. A light shield 310 prevents stray light from reaching photo sensor 308 and thereby interfering with the desirable control of the device. Light shield 310 is preferably opaque to light so as to minimize this stray light. Any significant levels of light then must necessarily pass through the candy element of lollipop 301 and then through optical passage 311 and optical window 309 before reaching photo sensor 308. It is assumed that stray light must also be prevented from entering optical window 309 or photo sensor 308 from the sides or those faces which are not oriented toward lollipop 301. This may conveniently be achieved by making housing 312 of an opaque or nearly opaque material and insuring that any joints or seams are tight. Overlapping "lips" such as are common in the construction of mating halves of injection molded plastic housings can achieve this light tightness. Optionally, stick receiver 303 may be extended out through the bottom of housing 312 so that in the event that lollipop stick 302 becomes stuck in stick receiver 303 such as in the event that all of the lollipop 301 has been consumed, that an item similar to lollipop stick 302 may be used to push lollipop stick 302 out of stick receiver 303 so that the device may be reused with a new candy element. Any manner of candy element may be used with this embodiment of the instant invention so long as the candy element will permit light to pass through it and to photo sensor 308. Alternately an opaque candy element may be used when, photo sensor 308 is positioned in such a fashion that it is proximal to the candy element and situated in such a manner so that it is exposed to levels of light proximal to the candy element. In this arrangement the levels of light reaching photo sensor 308 are more or less congruent with those to which the candy element is exposed and more importantly, those levels of light which vary in proportion to the position of the user's mouth or tongue relative to photo sensor 308 as user's tongue or mouth acts upon the candy element thereby creating the desired effect of control of the action generating means by the relative position of one's mouth, tongue, or other body member to the candy element.

Figure 14:
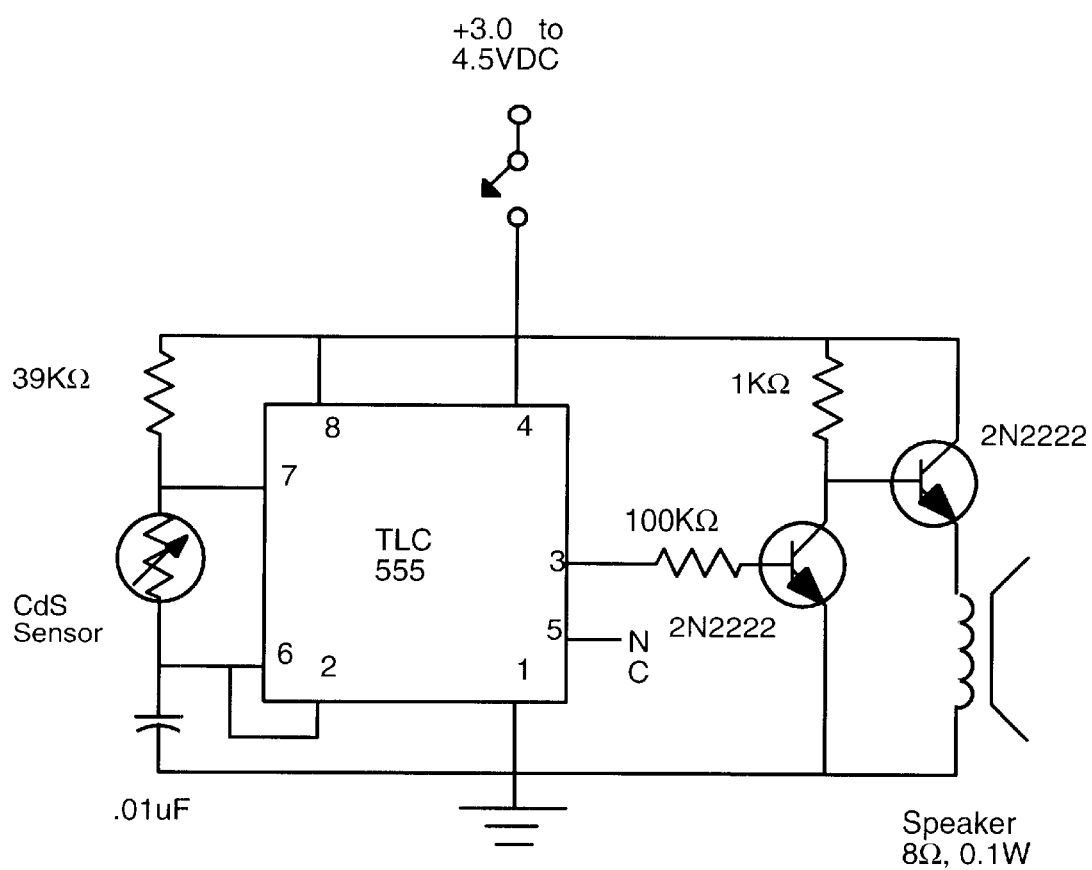
FIG. 14 is a schematic diagram of a light controlled oscillator.

The candy holder with optical control 300 then, functions in the following manner:

Light passes through lollipop 301 and through optical passage 311 and further through optical window 309. Said light then reaches photo sensor 308 (which may be of the cadmium sulfide type) whereby it affects the ohmic value of photo sensor 308. Photo sensor 308 is operatively coupled to a variable frequency audio oscillator circuit which frequency is controlled by the ohmic value of photo sensor 308 and therefore is responsive to the level of light falling on photo sensor 308. One such possible circuit is illustrated in FIG. 14. The electrical output of the variable frequency oscillator is connected to loudspeaker 306 whereupon the electrical signal is converted to sound. The variable frequency oscillator may be designed such that a decrease in light falling on photo sensor 308 causes a corresponding decrease in the audio frequency or musical pitch of the oscillator. Since the frequency of the oscillator is proportional to the level of ambient light passing through lollipop 301 and since this level of light may be more or less controlled by the degree with which one's mouth covers lollipop 301 it is evident that the musical pitch produced by candy holder with optical control 300 may be controlled by one's mouth in such a manner that musical notes and indeed, even songs may be played. Duration of sound output is controlled by holding down push button switch 307. It is relatively easy to play simple tunes on the instant invention and with a bit of practice even rather involved musical pieces may be performed.

Figure 15:
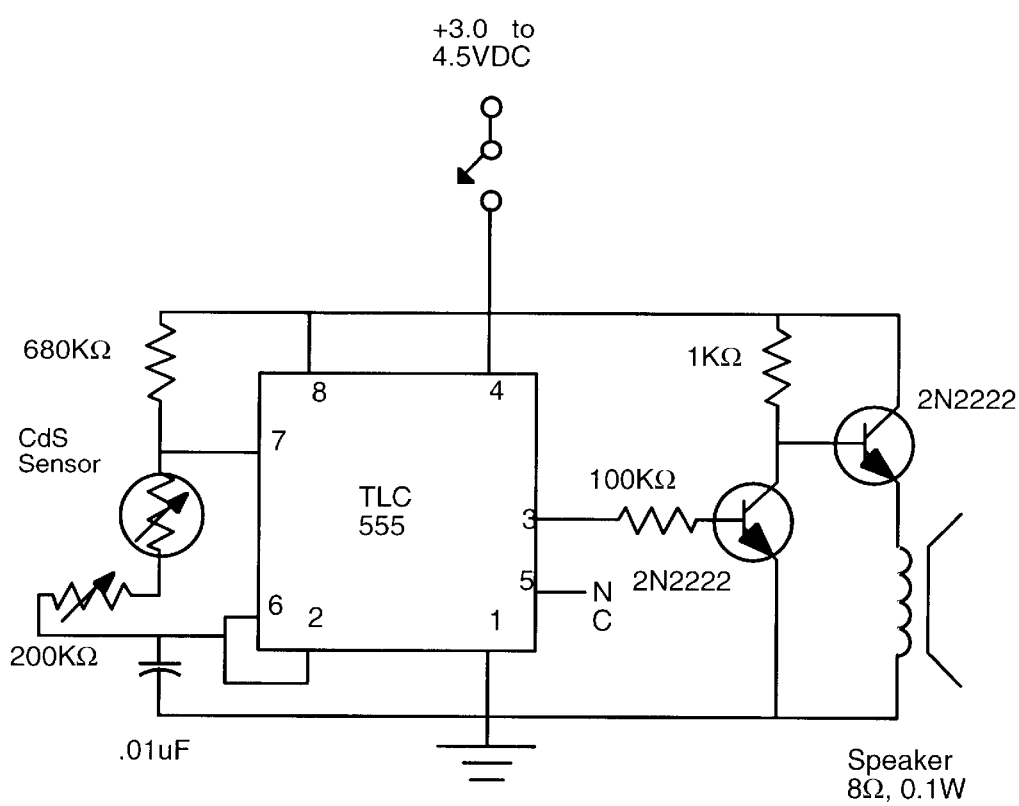
FIG. 15 is a schematic diagram of a light controlled oscillator which frequency may be manually adjusted.
Figure 16:
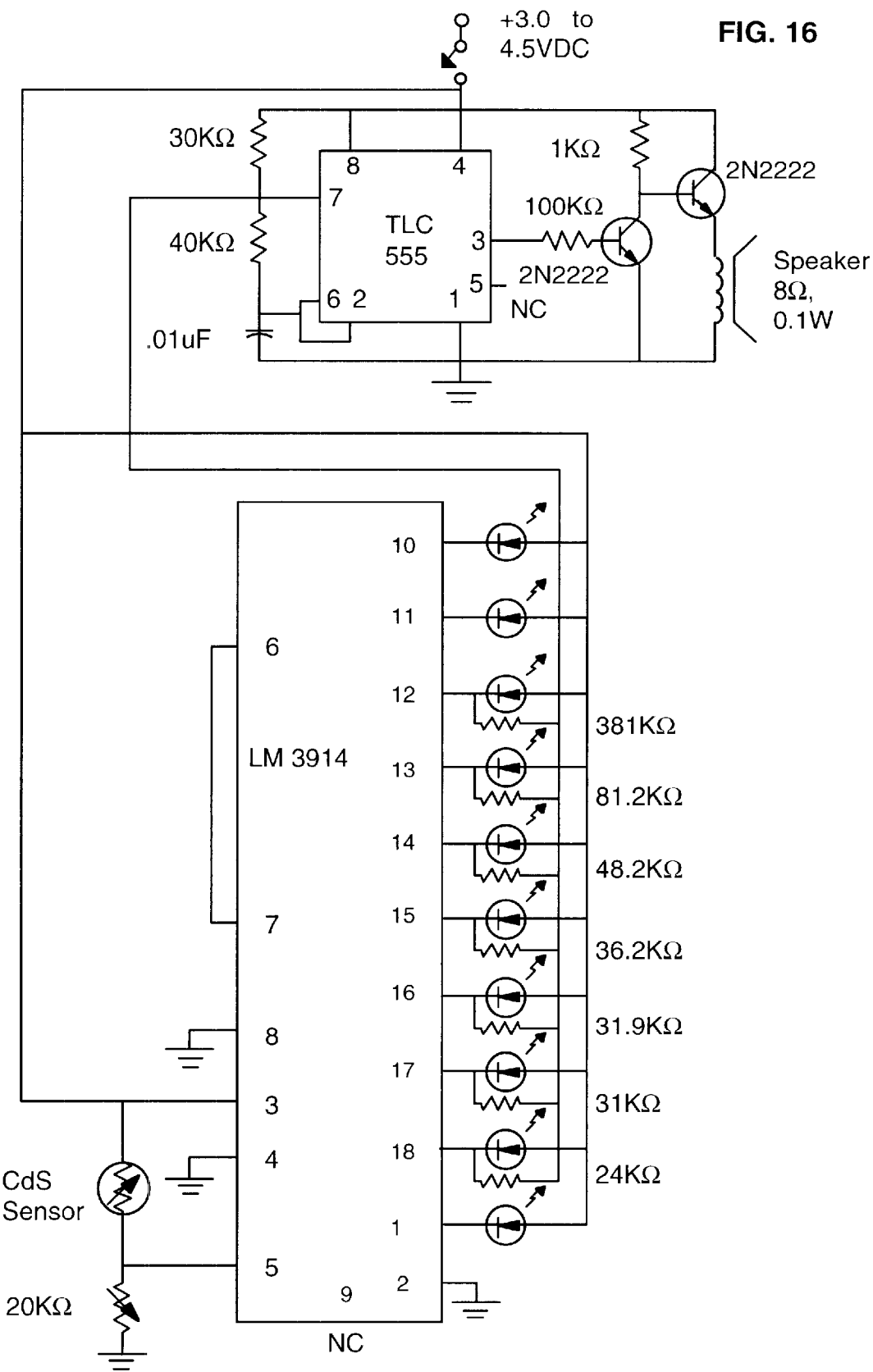
FIG. 16 is a schematic diagram of a light controlled oscillator which frequency is a step function of the light input level and is adjusted to a Western musical scale; and Table 1 shows measured resistance values for selected edible foodstuffs.

FIGS. 14, 15, and 16 illustrate circuits which may be employed to control the generation of sound by means of varying the light level transmitted through or proximal to an edible foodstuff. These circuits are illustrative only and it is understood that it is within the scope of this invention to include other specific means to achieve the desired effects.

Yet another embodiment of this invention includes means for providing an "electrical sensation" to the user's tongue, mouth or other body member from the device by means of producing a mild electrical shock which may be transmitted through the foodstuff. The electrical stimulation may also be used to alter sense of taste and thereby, the apparent flavor of the foodstuff.

In situations where the properties of the foodstuff make it difficult or impractical to rely on the electrical resistance, capacitance or optical properties of the foodstuff for action controlling means, a small switch or transducer 136 may be situated in the holder which is operatively coupled with the foodstuff and is responsive to forces applied to it by the foodstuff. This transducer may be a simple on-off switch or take the form of a "joystick" with a plurality of variable outputs.

Any of the above mentioned devices that create a response to user input could be equipped with a means to disable said response as may be desired.

Since in many cases the cost of the foodstuff holder 100 may be of relatively high cost as compared to the foodstuff 101, it may be desirable to make the holder reusable so that the foodstuff may be replaced once the original is consumed. Any of several means may be employed to temporarily but securely hold the foodstuff 101 in place in the holder 100.

In the case of candies as foodstuffs 101, it may be desirable to have the socket/contact be designed such that any of several "off the shelf" candies may be inserted into the holding socket 140. This feature permits the user to readily obtain refill foodstuff elements 101 at a variety of locations and offers additional variety over a single, dedicated-foodstuff design.

The instant invention therefore, teaches of a new and highly interesting device which makes advantageous use of optical, electrical or other physical conditions of a secured foodstuff to control an incorporated action generating means. Which means includes but are not limited to sound, light, movement, vibration, electrical stimulation and odor generation.

Although the invention has been described in terms of specific embodiments, it will be readily apparent to those skilled in this art that various modifications, rearrangements and substitutions can be made without departing from the spirit of the invention. It is understood that the means of producing the instant invention include but are not limited to the specific materials and embodiments described herein and that other means exist to meet the requirements of such a system. Such additional means are within the scope of this patent. The scope of the invention is defined by the claims appended hereto.

What is claimed is:

1. The combination of a foodstuff and a holding device that produces different levels of a sensory effect based upon manipulation thereof by a manipulator, said holding device comprising a rigid housing assembly having a means for holding foodstuff and a foodstuff member removably secured to said rigid housing, said rigid housing assembly including output means for producing at least one sensory effect selected from the group consisting of sound, light, movement, vibration, electrical stimulation, and odor generation at variable levels, said variable levels being proportionate to the relationship between said manipulator and said foodstuff member, a power supply for energizing said output means, said power supply being electrically coupled to said output means through a circuit assembly, said output means altering said levels of said at least one sensory effect by physical interaction between said foodstuff member and said manipulator wherein said manipulation causes corresponding changes in the level of said effect.

2. The combination of claim 1 further comprising said output means producing said at least one sensory effect at a particular level of intensity and said physical interaction causes a distortion of said particular level of intensity of said at least one sensory effect.

3. The combination of claim 2 wherein said at least one effect of electrical stimulation comprises a shocking sensation effective to alter the taste of said foodstuff.

4. The combination of claim 1 wherein said foodstuff is edible, said edible foodstuff being electrically connected with said output means, said physical interaction includes contact and consumption of said foodstuff by said manipulator, said at least one effect being altered by the consumption of said foodstuff.

5. The combination of claim 4 wherein said contact and consumption of said edible foodstuff produces an irregular surface on said foodstuff, continued contact and consumption of said irregular surface by said manipulator causes corresponding changes in said effect.

6. The combination of claim 1 wherein said physical interaction comprises changing the proximity between said foodstuff and said manipulator, said output means producing said at least one effect at one level, said change in proximity altering said at least one effect to another level.

7. The combination of claim 6 wherein the altering of said at least one effect is proportional to the change in proximity.

8. The holding device of claim 1, wherein said foodstuff is electrically conductive, and said control means includes a first electrically conductive member electrically associated with said housing and a second electrically conductive member electrically associated with said foodstuff, said first and second electrically conductive members adapted to be electrically connected by body portions of said manipulator that physically connect said first and second electrically conductive members.

9. The combination of a foodstuff and a holding device that produces different interactive levels of a sensory effect based upon manipulation thereof by a manipulator, said holding device comprising a rigid housing assembly having a means for holding foodstuff and a foodstuff member removably secured to said rigid housing, said rigid housing assembly including output means for producing at least one sensory effect selected from the group consisting of sound, light, movement, vibration, electrical stimulation, and odor generation at variable levels, a power supply for energizing said output means, said power supply being electrically coupled to said output means through a circuit assembly, said output means altering said levels of said at least one sensory effect by physical interaction between said foodstuff member and said manipulator wherein said manipulation causes corresponding changes in the level of said effect wherein said output means includes a control means, said control means regulates said at least one sensory effect based upon a capacitance of said circuit assembly, said capacitance being a product of said interaction between said manipulator and said foodstuff, wherein said foodstuff is optically conductive and said control means regulates said at least one sensory effect based upon an amount of light passing into a light registering member through said foodstuff.

10. The holding device of claim 9, wherein said control means regulates said sound based upon a conductivity of said circuit assembly, said conductivity being a product of said interaction between said manipulator and said foodstuff.

11. The holding device of claim 9, wherein said output means includes a voltage-controlled oscillator, and said at least one sensory effect includes at least one tone produced by said voltage-controlled oscillator upon electric completion of said circuit assembly, said at least one tone having a frequency proportional to said amount of light.

12. The combination of a foodstuff and a hand held holding device that produces a sensory effect based on manipulation thereof by a manipulator, said holding device comprising a housing assembly for holding a foodstuff and a foodstuff member removably secured to said housing, said housing assembly including output means for producing at least one sensory effect, a power supply for energizing said output means, said power supply electrically coupled to said housing, said output means and said foodstuff through a circuit assembly, whereby said circuit is closed and a sensory effect is produced when said hand held housing is manipulated to bring said foodstuff in contact with said manipulator.

* * * * *

(12) EX PARTE REEXAMINATION CERTIFICATE (5793rd)
United States Patent
Palmer et al.

(10) Number: US 6,383,536 C1
(45) Certificate Issued: Jun. 26, 2007

(54) INTERACTIVE FOODSTUFF HOLDING DEVICE

(75) Inventors: William Randall Palmer, Cameron Park, CA (US); Stephen Lynn Palmer, Cameron Park, CA (US)

(73) Assignee: Sierra Innotek, Inc., Cameron Park, CA (US)

Reexamination Request:
No. 90/007,698, Aug. 30, 2005

Reexamination Certificate for:
Patent No.: 6,383,536
Issued: May 7, 2002
Appl. No.: 09/378,233
Filed: Aug. 19, 1999

Related U.S. Application Data
(60) Provisional application No. 60/097,421, filed on Aug. 20, 1998.

(51) Int. Cl.
*A23G 3/00* (2006.01)
*A23G 4/00* (2006.01)

(52) U.S. Cl. .......................... 426/104; 426/90; 426/91; 426/132; 426/134; 446/81; 446/404; 446/484

(58) Field of Classification Search ...................... None
See application file for complete search history.

(56) References Cited

U.S. PATENT DOCUMENTS 5,939,983 A * 8/1999 Rudell et al. ............... 340/540
6,054,156 A * 4/2000 Rudell et al. ............... 426/104
6,325,693 B1 12/2001 Rudell et al.

* cited by examiner

*Primary Examiner*—Kiley Stoner

(57) ABSTRACT

An interactive foodstuff emits sound, light, motion or other action by the control and/or manipulation of the electrical, optical or physical conditions of or proximal to the foodstuff.

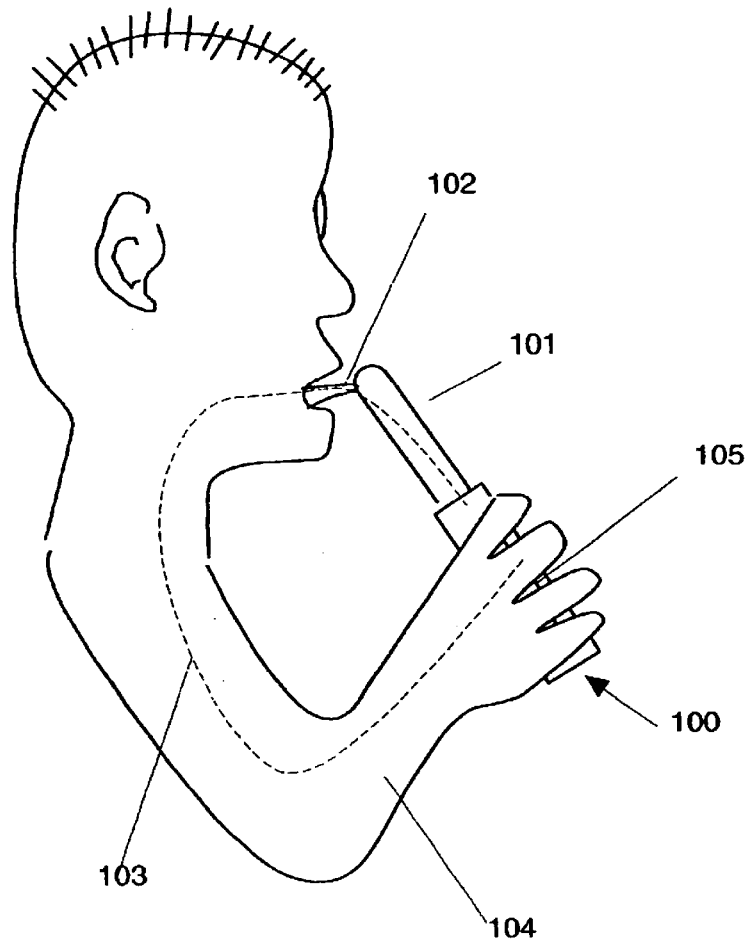

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-11 is confirmed.

Claim 12 is cancelled.

\* \* \* \* \*